(12) United States Patent
Shimada et al.

(10) Patent No.: US 12,054,090 B2
(45) Date of Patent: *Aug. 6, 2024

(54) VEHICLE LIGHT SYSTEM

(71) Applicant: HONDA MOTOR CO., LTD., Tokyo (JP)

(72) Inventors: Manabu Shimada, Wako (JP); Shigeto Iwamoto, Wako (JP); Keisuke Maeda, Wako (JP); Takashi Mai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/359,356

(22) Filed: Jul. 26, 2023

(65) Prior Publication Data

US 2023/0373382 A1 Nov. 23, 2023

Related U.S. Application Data

(63) Continuation of application No. 17/198,599, filed on Mar. 11, 2021, now Pat. No. 11,745,642.

(30) Foreign Application Priority Data

Mar. 16, 2020 (JP) .................... 2020-044878

(51) Int. Cl.
*B60Q 1/08* (2006.01)
*B60Q 1/00* (2006.01)
(Continued)

(52) U.S. Cl.
CPC ........... *B60Q 1/085* (2013.01); *B60Q 1/0076* (2013.01); *H05B 47/11* (2020.01); *H05B 47/115* (2020.01)

(58) Field of Classification Search
CPC ........ B60Q 1/085; B60Q 1/0076; B60Q 1/08; B60Q 1/143; B60Q 1/26; Y02B 20/40
See application file for complete search history.

(56) References Cited

U.S. PATENT DOCUMENTS 7,759,819 B2 * 7/2010 Michiyama .......... B60Q 1/1423
362/465
8,710,384 B2 * 4/2014 Son ........................ B60Q 1/00
200/18

(Continued)

FOREIGN PATENT DOCUMENTS

| CN | 1640719 A | 7/2005 |
| CN | 104203648 A | 12/2014 |

(Continued)

OTHER PUBLICATIONS

Japanese Office Action with English translation dated Dec. 7, 2021, 6 pages.

(Continued)

*Primary Examiner* — Alexander H Taningco
*Assistant Examiner* — Pedro C Fernandez
(74) *Attorney, Agent, or Firm* — Rankin, Hill & Clark LLP

(57) ABSTRACT

A present invention provide a vehicle light system which prevents low-beam headlights from being forgotten to turn on while a vehicle is traveling and is able to turn off the low-beam headlights when it is not necessary, a rotation position of a light switch includes an AUTO position, a SMALL position, and an OFF position, the light switch includes a momentary mechanism which returns a position to the AUTO position when the position is changed to the OFF position or the SMALL position, lights include the low-beam headlights and position lights, the AUTO position allows the low-beam headlights and the position lights to turn on or off depending on a brightness outside the vehicle, (Continued)

and a light control unit turns off the low-beam headlights and turns on the position lights when the rotation position is set to the AUTO position, the brightness outside the vehicle is lower than a predetermined value, a speed is lower than a first predetermined speed, and the rotation position is then changed to the SMALL position or the OFF position.

2 Claims, 6 Drawing Sheets

(51) Int. Cl.
*H05B 47/11* (2020.01)
*H05B 47/115* (2020.01)

(56) References Cited

U.S. PATENT DOCUMENTS

| | | | | |
|---|---|---|---|---|
| 10,843,621 | B2* | 11/2020 | Doi | B60Q 1/1476 |
| 2003/0098223 | A1* | 5/2003 | Uchiyama | B60Q 1/1476 |
| | | | | 200/61.54 |
| 2005/0195074 | A1 | 9/2005 | Kano | |
| 2015/0042226 | A1 | 2/2015 | Hibino | |
| 2015/0246634 | A1* | 9/2015 | Hall | H05B 47/11 |
| | | | | 315/79 |
| 2020/0150702 | A1* | 5/2020 | Ueda | B60W 30/0956 |
| 2021/0023980 | A1 | 1/2021 | Shimada et al. | |

FOREIGN PATENT DOCUMENTS

| | | |
|---|---|---|
| JP | 2005-170217 A | 6/2005 |
| WO | 2019/194212 A1 | 10/2019 |

OTHER PUBLICATIONS

Chinese Office Action issued Aug. 31, 2023 in corresponding Chinese application No. 202110275954.3; English machine translation included (19 pages).

* cited by examiner

VEHICLE LIGHT SYSTEM

CROSS-REFERENCE TO RELATED APPLICATIONS

The present application is a continuing application of and claims priority under 35 U.S.C. § 120 to U.S. patent application Ser. No. 17/198,599, filed Mar. 11, 2021, and claims priority under 35 U.S.C. § 119 to Japanese Patent Application No. 2020-044878, filed Mar. 16, 2020, the contents of which are hereby incorporated by reference in their entirety.

BACKGROUND OF THE INVENTION

1. Field of the Invention

The present invention relates to a light system for vehicles.

2. Description of the Related Art

Japanese Patent Laid-open Publication No. 2005-170217 discloses a light switch including an automatic light operating position enabling an automatic light function that automatically turns lights of a vehicle on or off depending on illuminance outside the vehicle.

In some vehicles on the market, a combination switch as the light switch has a following structure. The light switch is able to be set to OFF, AUTO, SMALL, and HEADLIGHT positions. When the light switch is set to the AUTO position, low-beam headlights and position lights (in other words, clearance lamp) are turned on or off depending on the illuminance outside the vehicle. Furthermore, such a vehicle performs the following operation when the light switch is set to the OFF position (to turn off the low-beam headlights and position lights). The light switch automatically returns from the OFF position to the AUTO position due to a momentary mechanism of the light switch. This means that the vehicle is designed not to travel while the light switch is in the OFF position.

When the light switch is set to the SMALL position, the low-beam headlights are turned off, and the position lights are turned on. When the light switch is set to the HEADLIGHT position, the low-beam headlights are turned on, and the position lights are also turned on.

The aforementioned technique is designed not to allow the vehicle to travel while the light switch is set in the OFF position, which effectively prevents the vehicle from being forgotten to turn on the light. However, the technique still allows the vehicle to travel while the light switch is set in the SMALL position. The vehicle therefore can travel with the low-beam headlights off. Thus, the technique has room for improvement in preventing the vehicle from being forgotten to turn on the low-beam headlights.

The low-beam headlights may be designed to be normally on when the vehicle is traveling (at least while it is so dark outside the vehicle that the low-beam headlights need to be on).

According to the aforementioned design, the low-beam headlights are turned on even when the vehicle's speed is low, for example, for parking the vehicle into a garage. At driving the vehicle at low speed, it may be assumed that there are various objects, such as walls and obstacles, around or near the vehicle. In such a case, light from the low-beam headlights is reflected by the objects and can interfere with driving of the vehicle. It is therefore preferable that the low-beam headlights be turned on depending on the vehicle's situation.

SUMMARY OF THE INVENTION

The present invention has been made to solve the above problems and makes it an object thereof to provide a vehicle light system which prevents the low-beam headlights from being forgotten to turn on while the vehicle is traveling and is able to turn off the low-beam headlights when it is not necessary.

According to the present invention, a light system for a vehicle includes: a combination switch set to a rotation position to be rotationally changed for switching modes of a light that provides illumination outside; a photosensor configured to detect brightness outside the vehicle; and a speed sensor configured to detect speed of the vehicle, in which the rotation position includes an AUTO position, a SMALL position, and an OFF position, the combination switch includes a mechanism which returns the position to the AUTO position when the position is changed to the OFF position or the SMALL position, the lights include low-beam headlights and position lights, and the AUTO position allows the low-beam headlights and position lights to turn on or off depending on the brightness outside the vehicle detected by the photosensor. The light system further includes: a light control unit configured to turn off the low-beam headlights and to turn on the position lights when the rotation position is set to the AUTO position, the brightness outside the vehicle detected by the photosensor is lower than a predetermined value, the speed detected by the speed sensor is lower than a first predetermined speed, and the rotation position is then changed to the SMALL position or the OFF position.

The present invention can provide a vehicle light system which prevents the low-beam headlights from being forgotten to turn on while the vehicle is traveling and is able to turn off the low-beam headlights when it is not necessary.

DETAILED DESCRIPTION OF EMBODIMENT

An embodiment of the present invention will be hereinafter described in detail with reference to the accompanying drawings.

Figure 1:
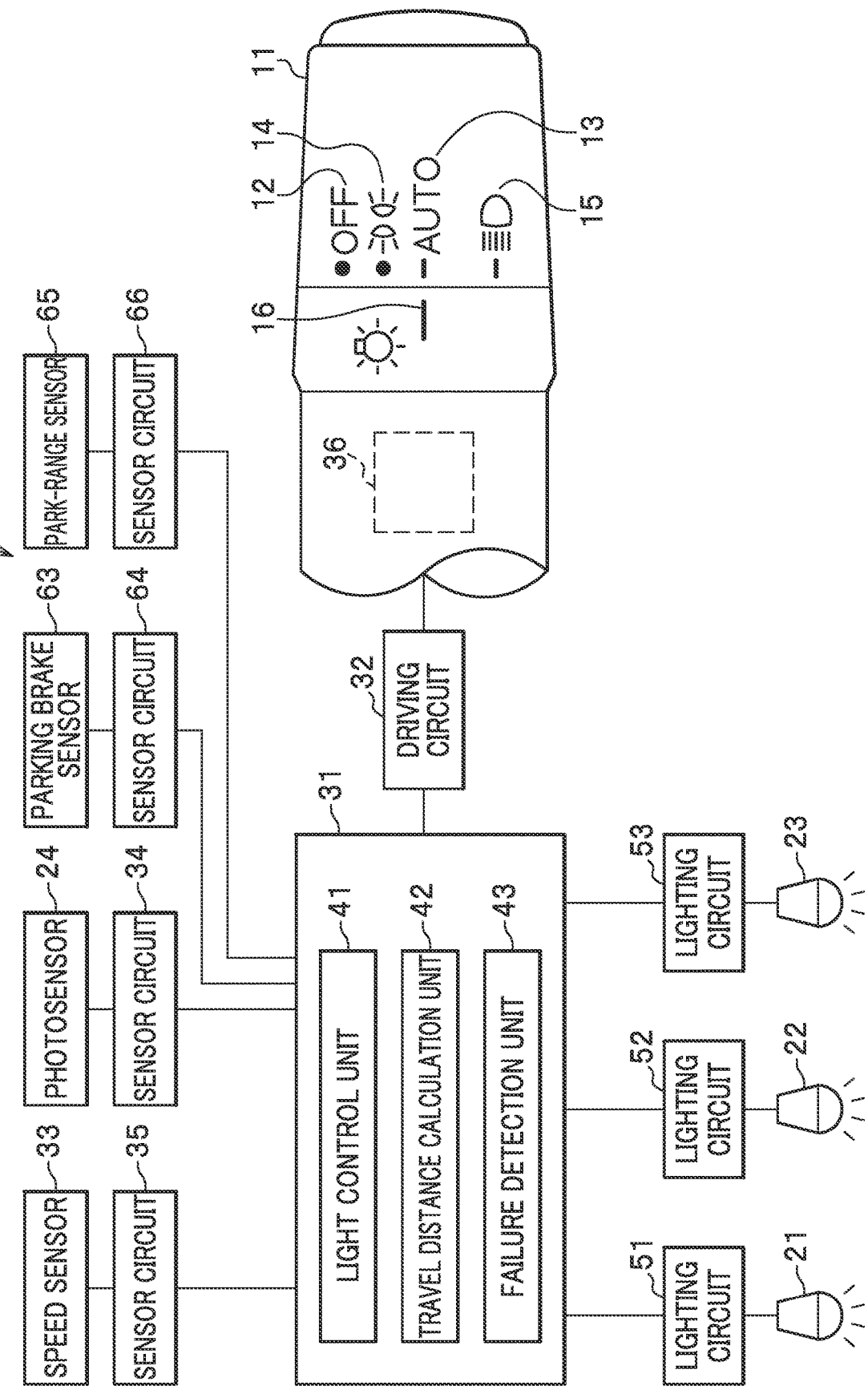
FIG. 1 is a block diagram showing the configuration of a vehicle light system according to an embodiment of the present invention.

FIG. 1 is a block diagram showing the configuration of a vehicle light system 1 according to the embodiment. The vehicle light system 1 is mounted in a vehicle for use. The vehicle light system 1 includes a light switch 11 provided at a predetermined position near the driver's seat of the vehicle. The light switch 11 is a combination switch that is rotated to switch plural modes of lights that provide illumination outside from the vehicle. The light switch 11, which is substantially cylindrical, is manually rotated in the circumferential direction to switch the plural (four in this embodiment) modes of lights.

The vehicle light system 1 includes four types of rotation positions, including an OFF position 12, an AUTO position 13, a SMALL position 14, and a HEADLIGHT position 15. On the lateral surface of the light switch 11, letters or symbols indicating these four positions, including the OFF position 12, AUTO position 13, SMALL position 14, and HEADLIGHT position 15, are displayed. These letters or symbols are aligned in the circumferential direction on the lateral surface of the light switch 11. Specifically, the HEADLIGHT position 15, AUTO position 13, SMALL position 14, and OFF position 12 are indicated in this order, starting from the near side of the driver. When the light switch 11 is manually rotated in the circumferential direction to set one of those positions to a reference position 16, the mode corresponding to the position set to the reference position 16 works. For example, "AUTO" mode works when the AUTO position 13 is set to the reference position 16 as illustrated in FIG. 1. "SMALL" mode works when the symbol for the SMALL position 14 is set to the reference position 16. "OFF" mode works when the OFF position 12 is set to the reference position 16. "HEADLIGHT" mode works when the HEADLIGHT position 15 is set to the reference position 16.

Hereinafter, the modes corresponding to the respective positions of the light switch 11 will be described below. The vehicle includes headlights which are located in the front of the vehicle and provide illumination ahead of the vehicle. The headlights include low-beam headlights 21 and high-beam headlights 23. The illumination distance of the high-beam headlights 23 is longer than that of the low-beam headlights 21. The vehicle further includes position lights 22 which are located in the front and rear of the vehicle and provide illumination around the vehicle. The illumination distance of the position lights 22 is shorter than that of the low-beam headlights 21. FIG. 1 illustrates only one low-beam headlight 21 and one high-beam headlight 23 for convenience, but a typical vehicle includes plural low-beam headlights 21 and plural high-beam headlights 23 (the same applies to the position lights 22). In the "OFF" mode, basically, the low-beam headlights 21 and position lights 22 mounted on the vehicle are all turned off, but various controls are performed for turning on or off of the low-beam headlights 21 and position lights 22 as described later.

This specification describes turning on and off of the low-beam headlights 21. A typical vehicle also includes the high-beam headlights 23. Switching between the low-beam headlights 21 and high-beam headlights 23 is performed with a not-illustrated switch that is different from the light switch 11. In a situation where the setting of the not-illustrated switch is the high-beam headlights 23, operations of turning on or off the high-beam headlights 23 correspond to operations of turning on or off the low-beam headlights 21 in this specification.

In recent years, some vehicles include a controller which automatically switches between the low-beam headlights 21 and high-beam headlights 23 by determining the situation ahead of the vehicle (whether there is an oncoming vehicle ahead, for example). For such vehicles, description of turning on or off of the low-beam headlights 21 in this specification means turning on or off of the low-beam headlights 21 or high-beam headlights 23 automatically selected by the controller.

The modes will be further described. In the AUTO mode, various controls are performed for turning on or off of the low-beam headlights 21 and position lights 22 as described later. Specifically, the low-beam headlights 21 and position lights 22 are turned on or off depending on whether the brightness outside the vehicle, which is detected with a photosensor 24, is lower than a predetermined value as described later.

The brightness detected with the photosensor 24 may be evaluated with two thresholds of different levels. When the detected brightness is less than the higher threshold (brighter), only the position lights 22 are turned on, and when the detected brightness is less than the lower threshold (darker), the low-beam headlights 21 and position lights 22 are both turned on.

In the "SMALL" mode, basically, the low-beam headlights 21 are turned off, and the position lights 22 are turned on. In the "HEADLIGHT" mode, basically, the low-beam headlights 21 are turned on, and the position lights 22 are turned on. In the "SMALL" mode, various controls are performed for turning on or off of the low-beam headlights 21 and position lights 22 as described later.

On the light switch 11 capable of changing the modes described above, the aforementioned positions for setting the respective modes are disposed in the following manner. On the lateral surface of the light switch 11, the AUTO position 13 is indicated. On one side of the AUTO position 13 in the circumferential direction, or on the opposite side of the AUTO position 13 from the driver in this embodiment, the SMALL position 14 is indicated. On the opposite side of the SMALL position 14 from the driver, the OFF position 12 is indicated. On the other side of the AUTO position 13 in the circumferential direction, or on the driver's side of the AUTO position 13 in this embodiment, the HEADLIGHT position 15 is indicated. When the light switch 11 is moved to any of these positions, the light switch 11 gives a click feeling to the driver's hand by a publicly-known means.

The light switch 11 includes a momentary mechanism 36 (mechanism). The momentary mechanism 36 is a publicly-known structure including a torsion spring and the like. When the driver moves the light switch 11 to the OFF position 12 or SMALL position 14, the momentary mechanism 36 returns the light switch 11 to the AUTO position 13 with spring force of the torsion spring and the like. When the driver moves the light switch 11 to the HEADLIGHT position 15, the momentary mechanism 36 does not work so that the light switch 11 remains in the HEADLIGHT position 15.

The light switch 11 is connected to a driving circuit 32. The driving circuit 32 notifies a controller 31 of which of the HEADLIGHT position 15, AUTO position 13, SMALL position 14, and OFF position 12 is set to the reference position 16 as a control signal. The controller 31 is a control apparatus mainly composed of a microcomputer, for example.

The controller 31 is connected to the photosensor 24 described above through a sensor circuit 34 as an interface and to a speed sensor 33, which detects speed of the vehicle, through a sensor circuit 35 as an interface. The controller 31 is connected to a parking brake sensor 63 through a sensor circuit 64. The parking brake sensor 63 detects on or off of a parking brake (not illustrated) of the vehicle. The controller 31 is connected to a park-range sensor 65 though a sensor circuit 66. The park-range sensor 65 detects on or off of a park range of a gear shifter (not illustrated) of the vehicle. These sensors and controller 31 do not need to be directly connected and may communicate each other through a controller area network (CAN).

The controller 31 is connected to the low-beam headlights 21, position lights 22, and high-beam headlights 23 through lighting circuits 51 to 53 as interfaces, respectively. The low-beam headlights 21, position lights 22, and high-beam headlights 23 respectively include plural low-beam headlights 21, plural position lights 22, and plural high-beam headlights 23 unlike those illustrated. The lighting circuits 51 to 53 are supplied with electric power from a not-illustrated battery mounted on the vehicle to illuminate the low-beam headlights 21, position lights 22, and high-beam headlights 23.

When the light switch 11 is in the AUTO position 13, the low-beam headlights 21, position lights 22, and high-beam headlights 23 turn on or off based on the control signal from the controller 31. When the light switch 11 is in the OFF position 12, SMALL position 14, or HEADLIGHT position 15, the low-beam headlights 21, position lights 22, and high-beam headlights 23 also turn on or off based on the control signal from the controller 31.

The controller 31 operates based on a predetermined program to execute the functions of a light control unit 41, a travel distance calculation unit 42, and a failure detection unit 43. The light control unit 41 controls turning on and off of the low-beam headlights 21 and position lights 22 depending on the situation of the vehicle. The travel distance calculation unit 42 calculates a distance (travel distance) traveled by the vehicle from a certain point to another point. The travel distance calculation unit 42 determines the travel distance by adding up vehicle speeds received from the speed sensor 33 at regular intervals. The failure detection unit 43 detects whether the sensors illustrated in FIG. 1 have failed.

Figure 2:
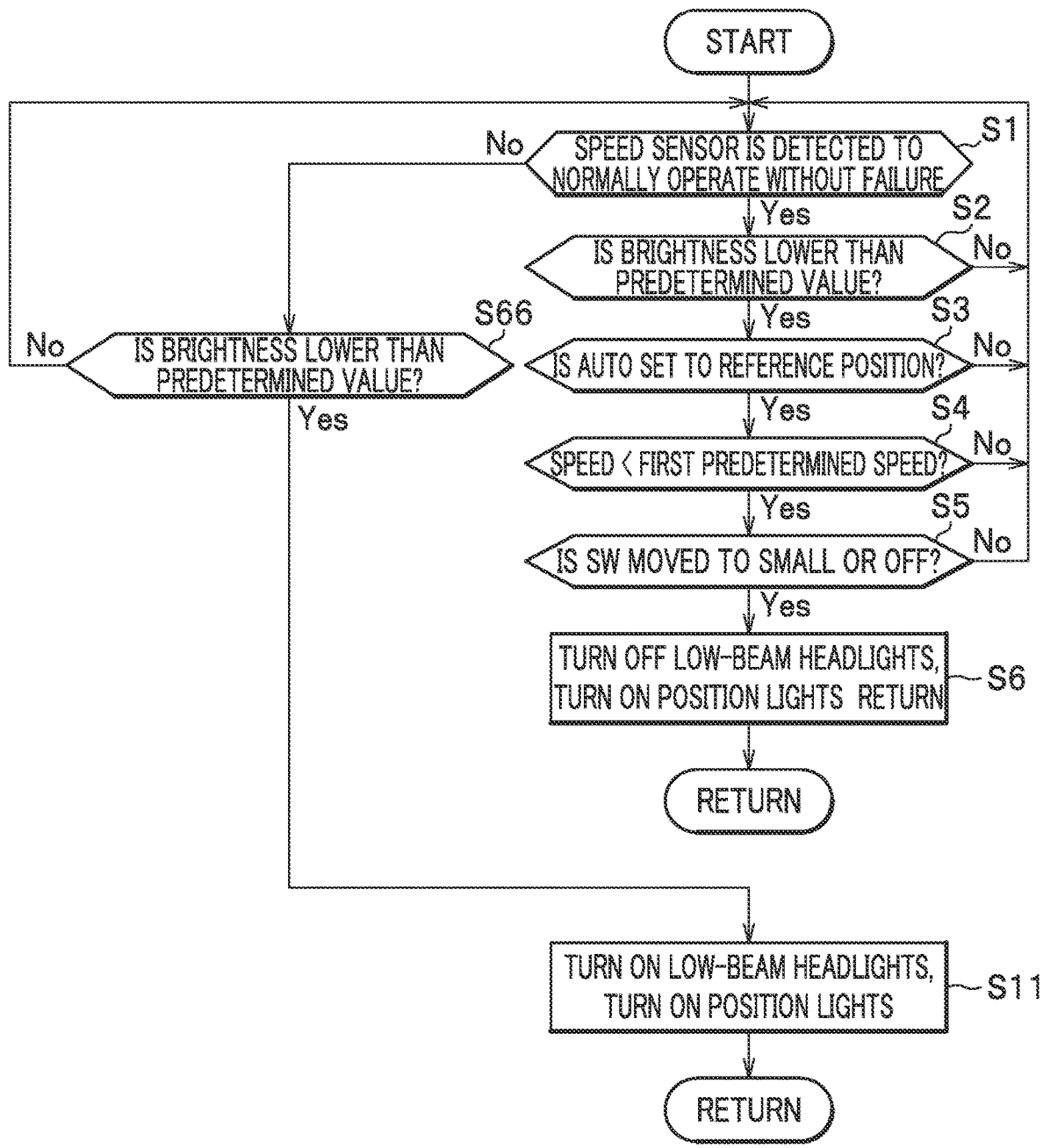
FIG. 2 is a flowchart showing a first process executed by the vehicle light system according to the embodiment of the present invention.
Figure 3:
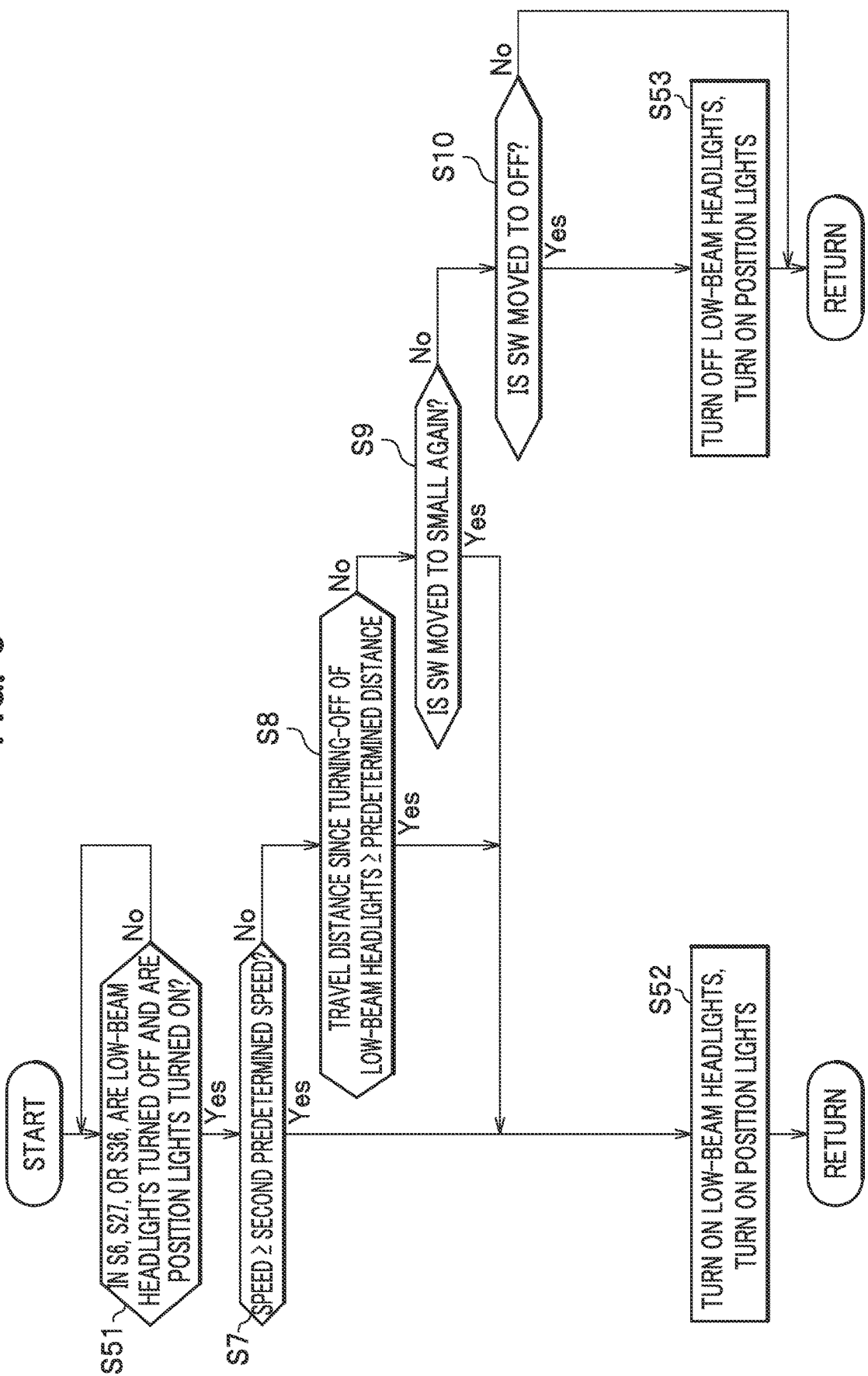
FIG. 3 is a flowchart showing a second process executed by the vehicle light system according to the embodiment of the present invention.
Figure 4:
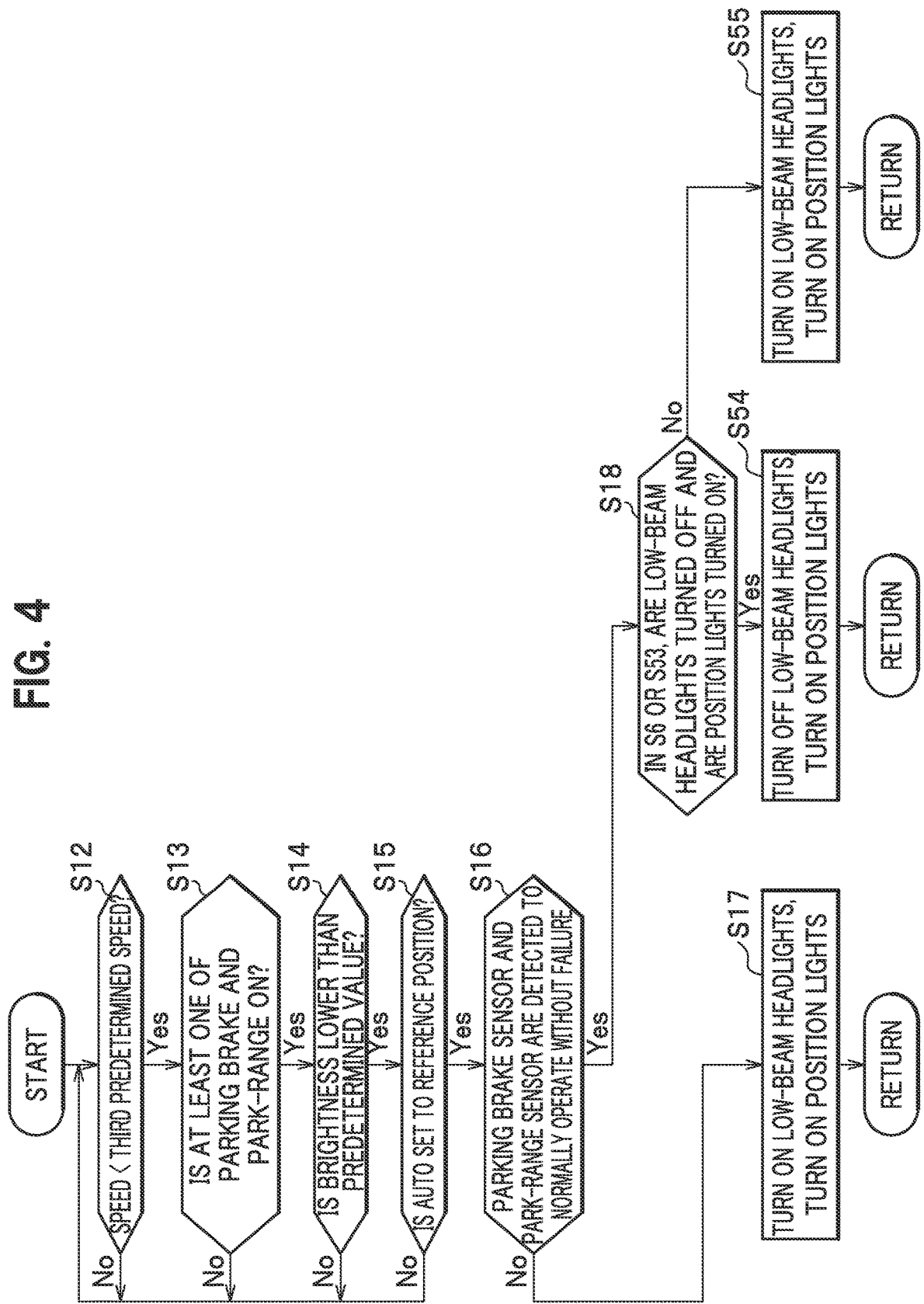
FIG. 4 is a flowchart showing a third process executed by the vehicle light system according to the embodiment of the present invention.
Figure 5:
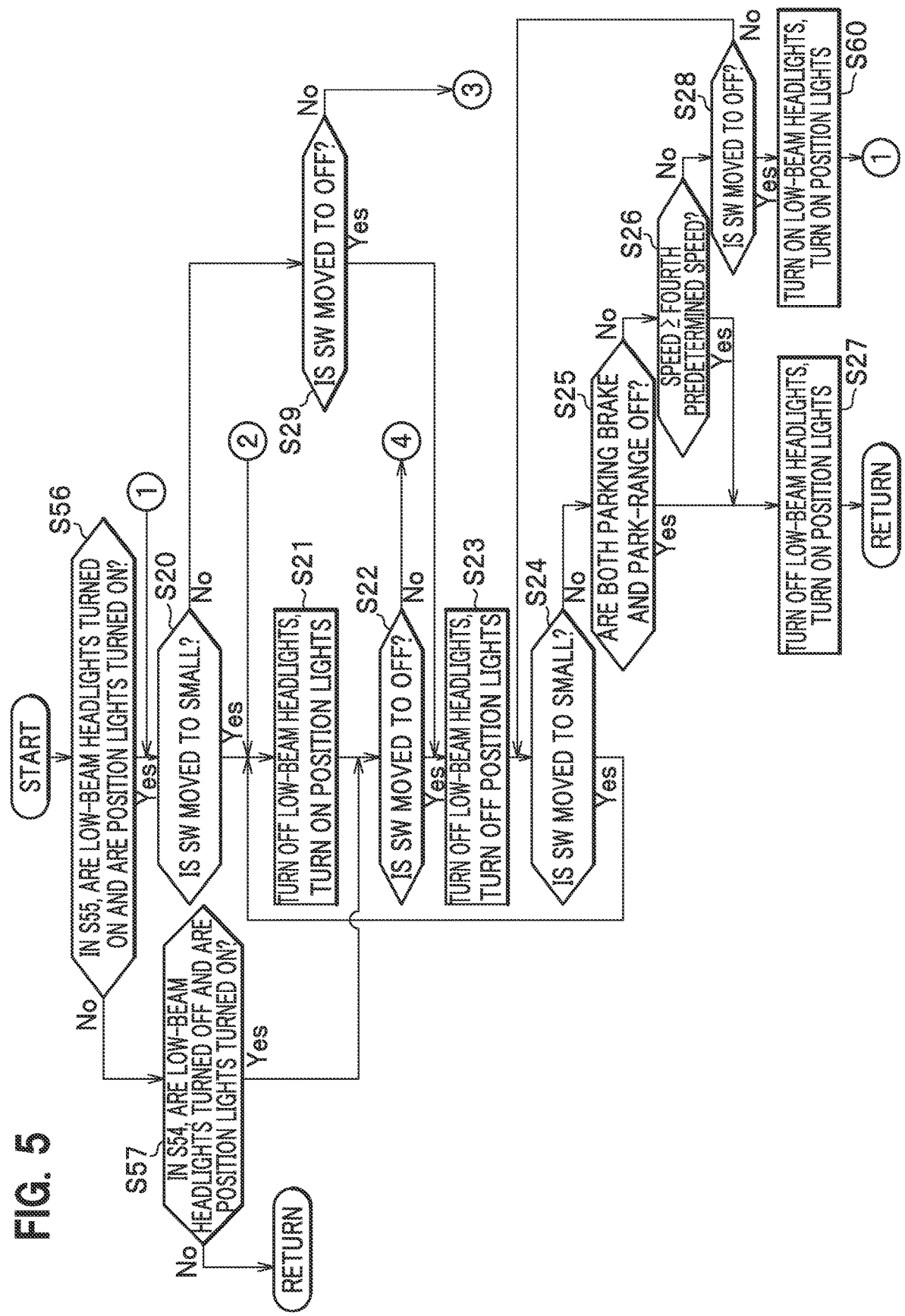
FIG. 5 is a flowchart showing a fourth process executed by the vehicle light system according to the embodiment of the present invention.
Figure 6:
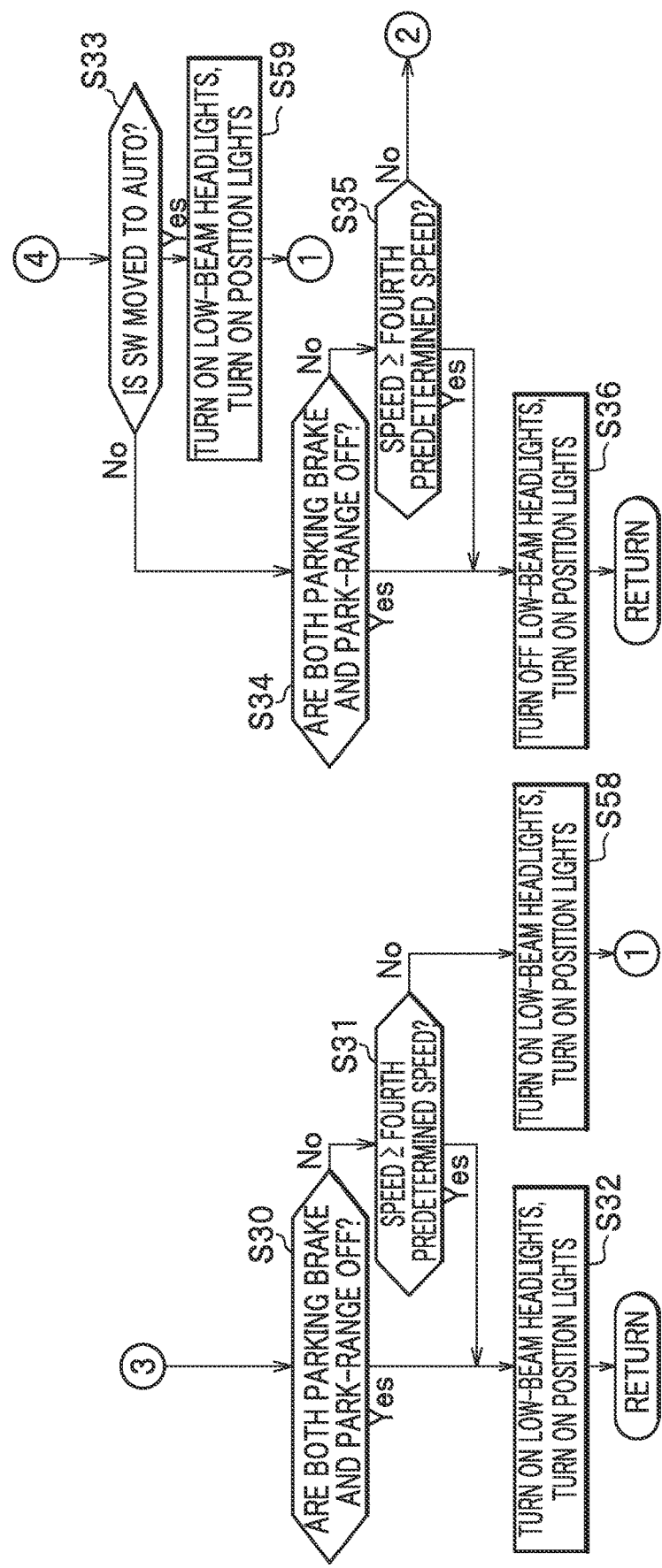
FIG. 6 is a flowchart showing the fourth process executed by the vehicle light system according to the embodiment of the present invention.

FIGS. 2 to 6 are flowcharts of processes executed by the light control unit 41. FIGS. 2 to 4 are flowcharts for explaining first, second, and third processes, respectively. FIGS. 5 and 6 are flowcharts for explaining a fourth process. FIGS. 5 and 6 illustrate the fourth process of a series of processing in two flowcharts with connectors indicated by circled numbers. The first to fourth processes individually operate in parallel on the microcomputer constituting the controller 31. While the ignition switch (not illustrated) of the vehicle is on, one of the first to fourth processes is executed to determine whether to turn on or off the low-beam headlights 21 and position lights 22 and accordingly turn on or off the low-beam headlights 21 and position lights 22. In the following description, first, second, third, and fourth predetermined speeds satisfy the relationship of: second predetermined speed≥first predetermined speed>fourth predetermined speed≥third predetermined speed.

First, the first process illustrated in FIG. 2 will be described. In the first process, the failure detection unit 43 determines whether a failure is detected in the speed sensor 33, or the speed sensor 33 is detected to normally operate without failure (S1). As a way to detect a failure of the speed sensor 33, for example, the failure detection unit 43 determines that a failure is detected in the speed sensor 33 when the controller 31 does not receive a predetermined signal that the controller 31 is designed to receive when the speed sensor 33 is normally operating. When no failure is detected in the speed sensor 33 (Yes in S1), the light control unit 41 determines whether the brightness outside the vehicle detected with the photosensor 24 is lower than a predetermined value (S2). When the brightness outside the vehicle detected with the photosensor 24 is lower than the predetermined value (Yes in S2), the light control unit 41 determines whether the AUTO position 13 is set to the reference position 16 in the light switch 11 (S3). When the AUTO position 13 is set to the reference position 16 (Yes in S3), the light control unit 41 determines whether current speed of the vehicle detected by the speed sensor 33 is lower than the first predetermined speed (S4). When the current speed of the vehicle detected by the speed sensor 33 is lower than the first predetermined speed (Yes in S4), the light control unit 41 determines whether the light switch 11 is moved to the SMALL position 14 or OFF position 12 (S5). When the light switch 11 is moved to the SMALL position 14 or OFF position 12 (Yes in S5), the light control unit 41 turns off the low-beam headlights 21 and turns on the position lights 22 (S6). The light control unit 41 then returns the process. When the driver releases his/her hand from the light switch 11 after moving the light switch 11 to the SMALL position 14 or OFF position 12, the AUTO position 13 returns to the reference position 16 in the light switch 11 by the momentary mechanism 36.

On the other hand, when the brightness outside the vehicle is not lower than the predetermined value (No in S2), when the light switch 11 is not set to the AUTO position 13 (No in S3), when the speed of the vehicle is not less than the first predetermined speed (No in S4), or when the light switch 11 is not moved to the SMALL position 14 or OFF position 12 (No in S5), the light control unit 41 returns the process to S1. The determinations of S1 to S4 may be executed in a different order.

When a failure is detected in the speed sensor 33 in S1 (No in S1), the light control unit 41 determines whether the brightness outside the vehicle detected by the photosensor 24 is lower than a predetermined value (S66). When the brightness outside the vehicle detected by the photosensor 24 is lower than the predetermined value (Yes in S66), the light control unit 41 turns on the low-beam headlights 21 and position lights 22 (S11) and returns the process. In this case, even if the light switch 11 is moved to the SMALL position 14 or OFF position 12, the low-beam headlights 21 and position lights 22 remain on.

When the brightness outside the vehicle is not lower than the predetermined value (No in S66), the light control unit 41 returns the process to S1.

Next, the second process illustrated in FIG. 3 will be described. The light control unit 41 first determines whether the low-beam headlights 21 are turned off through the processing of S6 described above or processing of S27 or S36 described later while the position lights 22 are turned on (S51). For example, when the low-beam headlights 21 are turned off in S6 described above while the position lights 22 are turned on (Yes in S51), the light control unit 41 goes to S7; and otherwise (No in S51), the light control unit 41 returns to S51.

In S7, the light control unit 41 determines whether the current speed of the vehicle detected by the speed sensor 33 is equal to or higher than the second predetermined speed. The second predetermined speed is a threshold to determine whether the vehicle speeds up from crawling speed to traveling speed. The second predetermined speed is equal to or higher than the first predetermined speed. When the vehicle speed is equal to or higher than the second predetermined speed (Yes in S7), the light control unit 41 turns on the low-beam headlights 21 and position lights 22 (S52). When the vehicle speed is lower than the second predetermined speed (No in S7), the travel distance calculation unit 42 calculates the distance (travel distance) traveled since the low-beam headlights 21 are turned off (since the low-beam headlights 21 are turned off in S6, for example) and determines whether the travel distance is equal to or longer than a predetermined distance (S8). The travel distance is accumulated until reaching the predetermined distance even though the vehicle stops many times. After reaching the predetermined distance (Yes in S8), the accumulated travel distance is reset when the ignition switch (not illustrated) of the vehicle is turned off. When the travel distance is equal to or longer than the predetermined distance (Yes in S8), the light control unit 41 turns on the low-beam headlights 21 and position lights 22 (S52).

When the travel distance is shorter than the predetermined distance (No in S8), the light control unit 41 determines whether the light switch 11 is moved again to the SMALL position 14 (S9) after the low-beam headlights 21 are turned off according to Yes determined in S5 in FIG. 2 (S6). When the light switch 11 is moved to the SMALL position 14 (Yes in S9), the light control unit 41 turns on the low-beam headlights 21 and position lights 22 (S52). When the light switch 11 is not moved to the SMALL position 14 (No in S9), the light control unit 41 determines whether the light switch 11 is moved to the OFF position 12 (S10). When the light switch 11 is moved to the OFF position 12 (Yes in S10), the light control unit 41 turns off the low-beam headlights 21 and turns on the position lights 22 (S53). When the light switch 11 is not moved to the OFF position 12 (No in S10), the light control unit 41 returns the second process. If the driver releases his/her hand from the light switch 11 after moving the light switch 11 to the SMALL position 14 or OFF position 12, the AUTO position 13 returns to the reference position 16 in the light switch 11 by the momentary mechanism 36.

Next, the third process illustrated in FIG. 4 will be described. The light control unit 41 first determines whether the current speed of the vehicle is lower than the third predetermined speed (S12). The third predetermined speed is a threshold to determine whether the vehicle which has been moving at crawling speed is substantially stopped. The third predetermined speed is lower than the first and second predetermined speeds. When the vehicle speed is lower than the third predetermined speed (Yes in S12), the light control unit 41 then determines with the parking brake sensor 63 and park-range sensor 65 whether at least one of the parking brake and park range is on (S13). When at least one of the parking brake and park-range is on (Yes in S13), the light control unit 41 determines whether the brightness outside the vehicle detected by the photosensor 24 is lower than the predetermined value (S14). When the brightness outside the vehicle detected by the photosensor 24 is lower than the predetermined value (Yes in S14), the light control unit 41 determines whether the AUTO position 13 is set to the reference position 16 in the light switch 11 (S15). When the AUTO position 13 is set to the reference position 16 (Yes in S15), the failure detection unit 43 determines whether a failure is detected in the parking brake sensor 63 or park-range sensor 65, or the parking brake sensor 63 and the park-range sensor 65 are detected to normally operate without failure (S16). The determination for this failure detection may be performed depending on whether the controller 31 receives signals which the controller 31 is designed to receive from the parking brake sensor 63 and park-range sensor 65 when these sensors are operating normally. When at least one of the parking brake sensor 63 and park-range sensor 65 is determined to have failed (No in S16), the light control unit 41 turns on the low-beam headlights 21 and position lights 22 (S17). The determinations of S12 to S16 may be executed in a different order.

When the light control unit 41 determines that neither the parking brake sensor 63 nor park-range sensor 65 has failed (Yes in S16), the light control unit 41 determines whether the low-beam headlights 21 are turned off in S6 or S53 while the position lights 22 are turned on (S18). When the low-beam headlights 21 are turned off in S6 or S53 while the position lights 22 are turned on (Yes in S18), the light control unit 41 turns off the low-beam headlights 21 and turns on the position lights 22 (S54), and otherwise (No in S18), the light control unit 41 turns on the low-beam headlights 21 and position lights 22 (S55). After S54 and S55 are processed, the light control unit 41 returns to the third process.

Next, the fourth process illustrated in FIGS. 5 and 6 will be described. The light control unit 41 first determines whether the low-beam headlights 21 and position lights 22 are turned on in S55 (S56). When the low-beam headlights 21 and position lights 22 are turned on in S55 (Yes in S56), the light control unit 41 determines whether the light switch 11 is moved to the SMALL position 14 (S20). When the light switch 11 is moved to the SMALL position 14 (Yes in S20), the light control unit 41 turns off the low-beam headlights 21 and turns on the position lights 22 (S21). When the light switch 11 is not moved to the SMALL position 14 in S20 (No in S20), the light control unit 41 determines whether the light switch 11 is moved to the OFF position 12 (S29).

When both the low-beam headlights 21 and the position lights 22 are not turned on in S55 (No in S56), the light control unit 41 determines whether the low-beam headlights 21 are turned off in S54 while the position lights 22 are turned on (S57). When the low-beam headlights 21 are turned off in S57 while the position lights 22 are turned on (Yes in S57), or when the low-beam headlights 21 are turned off in S21 while the position lights 22 are turned on, the light control unit 41 determines whether the light switch 11 is moved to the OFF position 12 (S22).

When the light switch 11 is moved to the OFF position 12 in S29 or S22 (Yes in S29, Yes in S22), the light control unit 41 turns off the low-beam headlights 21 and position lights 22 (S23). When the light switch 11 is not moved to the OFF position 12 in S29 (No in S29), the light control unit 41 advances the process to S30 (FIG. 6). When the light switch 11 is not moved to the OFF position 12 in S22 (No in S22), the light control unit 41 advances the process to S33 (FIG. 6). The determinations in S20 and S29 may be changed.

Following S23, the light control unit 41 determines whether the light switch 11 is moved to the SMALL position 14 (S24). When the light switch 11 is moved to the SMALL position 14 (Yes in S24), the light control unit 41 returns the process to S21. When the light switch 11 is not moved to the SMALL position 14 (No in S24), the light control unit 41 determines with the parking brake sensor 63 and park-range sensor 65 whether both of the parking brake and park range are off (S25). When both of the parking brake and park range are off (Yes in S25), the light control unit 41 turns off the low-beam headlights 21 and turns on the position lights 22 (S27).

When at least one of the parking brake and park range is on (No in S25), the light control unit 41 determines with the speed sensor 33 whether the current speed of the vehicle is equal to or higher than the fourth predetermined speed (S26). The fourth predetermined speed is a threshold to determine whether the vehicle which has been substantially stopped starts to move at crawling speed. The fourth predetermined speed is lower than the first and second predetermined speeds and is equal to or higher than the third predetermined speed. When the speed of the vehicle is equal to or higher than the fourth predetermined speed (Yes in S26), the light control unit 41 turns off the low-beam headlights 21 and turns on the position lights 22 (S27).

When the speed of the vehicle is lower than the fourth predetermined speed (No in S26), the light control unit 41 determines whether the light switch 11 is moved to the OFF position 12 (S28). When the light switch 11 is moved to the OFF position 12 (Yes in S28), the light control unit 41 turns on the low-beam headlights 21 and position lights 22 (S60) and then returns the process to S20 (FIG. 5). When the light switch 11 is not moved to the OFF position 12 (No in S28), the light control unit 41 returns the process to S24. The determinations of S25 and S26 may be executed in a different order. Furthermore, the determinations of S24, (S25, S26), and S28 may be executed in a different order.

In FIG. 6, when the light switch 11 is not moved to the OFF position 12 in S29 described above in FIG. 5 (No in S29), the light control unit 41 determines with the parking brake sensor 63 and park-range sensor 65 whether both of the parking brake and park range are off (S30). When both of the parking brake and park range are off (Yes in S30), the light control unit 41 turns on the low-beam headlights 21 and position lights 22 (S32) and then returns the process.

When at least one of the parking brake and park range is on (No in S30), the light control unit 41 determines with the speed sensor 33 whether the current speed of the vehicle is equal to or higher than the fourth predetermined speed (S31). The determinations of S30 and S31 may be executed in a different order. When the current speed of the vehicle is equal to or higher than the fourth predetermined speed (Yes in S31), the light control unit 41 turns on the low-beam headlights 21 and position lights 22 (S32) and returns the process. When the current speed of the vehicle is lower than the fourth predetermined speed (No in S31), the light control unit 41 turns on the low-beam headlights 21 and position lights 22 (S58) and returns the process to S20 in FIG. 5.

When the light switch 11 is not moved to the OFF position 12 in S22 described above in FIG. 5 (No in S22), in FIG. 6, the light control unit 41 determines whether the light switch 11 is moved to the SMALL position 14 (S33). The determinations of S22 and S33 may be executed in a different order. When the light switch 11 is moved to the SMALL position 14 (Yes in S33), the light control unit 41 turns on the low-beam headlights 21 and position lights 22 (S59) and then returns the process to S20 in FIG. 5.

When the light switch 11 is not moved to the SMALL position 14 and remains in the AUTO position 13 (No in S33), the light control unit 41 determines with the parking brake sensor 63 and park-range sensor 65 whether both of the parking brake and park range are off (S34). When both of the parking brake and park range are off (Yes in S34), the light control unit 41 turns off the low-beam headlights 21 and turns on the position lights 22 (S36). The light control unit 41 then returns the process. When at least one of the parking brake and park range is on (No in S34), the light control unit 41 determines with the speed sensor 33 whether the current speed of the vehicle is equal to or higher than the fourth predetermined speed (S35). The determinations of S34 and S35 may be executed in a different order. When the current speed of the vehicle is equal to or higher than the fourth predetermined speed (Yes in S35), the light control unit 41 turns off the low-beam headlights 21 and turns on the position lights 22 (S36). The light control unit 41 then returns the process. When the current speed of the vehicle is lower than the fourth predetermined speed (No in S35), the light control unit 41 returns the process to S21 in FIG. 5.

Not described in the flowcharts illustrated above, when the light switch 11 is in the HEADLIGHT position 15, the controller 31 maintains the low-beam headlights 21 and position lights 22 being turned on. This may be implemented by switching of a certain switching circuit, instead of a process executed by the controller 31.

The operation effects of the aforementioned vehicle light system 1 will be described.

The light switch 11 of the vehicle light system 1 is provided with the momentary mechanism 36. The light switch 11 thereby returns to the AUTO position 13 when the driver releases his/her hand from the light switch 11 after moving the light switch 11 to the OFF position 12 or SMALL position 14. This prevents the light switch 11 from remaining in the OFF position 12 or SMALL position 14 and leaving necessary lights off.

However, the driver can hold the light switch 11 with his/her hand to keep the position of the light switch 11 set to the OFF position 12 or SMALL position 14. The controller 31 therefore controls turning on and off of the low-beam headlights 21 and position lights 22 as described above when the position of the light switch 11 is set to the OFF position 12 or SMALL position 14.

The light control unit 41 turns off the low-beam headlights 21 and turns on the position lights 22 (S6) when the AUTO position 13 is set to the reference position 16 in the light switch 11 (Yes in S3), the brightness outside the vehicle is lower than the predetermined value (Yes in S2), the current speed of the vehicle is lower than the first predetermined speed (Yes in S4), and the position of the light switch 11 is changed to the SMALL position 14 or OFF position 12 (Yes in S5). When the vehicle is crawling in semi-darkness outside, the driver can turn off the low-beam headlights 21 unwanted by changing the position of the light switch 11 to the OFF position 12 or SMALL position 14.

When the low-beam headlights 21 are turned off in S6, S27, or S36 while the position lights 22 are turned on (Yes in S51) and the speed of the vehicle is equal to or higher than the second predetermined speed (Yes in S7), the low-beam headlights 21 and position lights 22 are turned on (S52). In other words, when the vehicle speeds up from crawling speed to traveling speed after the low-beam headlights 21 are turned off in S6, S27, or S36, the low-beam headlights 21 are turned on again. This prevents the vehicle from being forgotten to turn on being forgotten to turn on the low-beam headlights 21 again.

When the low-beam headlights 21 are turned off in S6 (FIG. 2), S27 (FIG. 5), or S36 (FIG. 6) while the position lights 22 are turned on (Yes in S51) and the distance (travel distance) traveled since the low-beam headlights 21 are turned off reaches the predetermined distance or longer (Yes in S8), the low-beam headlights 21 and position lights 22 are both turned on (S52 in FIG. 3). Even if the vehicle is moving at crawling speed (Yes in S4 in FIG. 2), it could be hard for the driver to drive the vehicle with the low-beam headlights 21 off in semi-darkness (Yes in S2 in FIG. 2). The low-beam headlights 21 are therefore turned on again when the vehicle travels a certain distance with the low-beam headlights 21 off. This allows minimum travel of the vehicle with the low-beam headlights 21 off and prevents the vehicle from being forgotten to turn on the low-beam headlights 21.

When the low-beam headlights 21 are turned off while the position lights 22 are turned on in S6 in FIG. 2, S27 in FIG. 5, or S36 in FIG. 6 (Yes in S51) and the position of the light switch 11 is then changed to the SMALL position 14 (Yes in S9), the low-beam headlights 21 and position lights 22 are turned on (S52). From drivability perspective, it is desirable that the driver is able to turn on the low-beam headlights 21 again anytime the driver wants to. The light switch 11 is provided with the HEADLIGHT position 15. When the position of the light switch 11 is set to the HEADLIGHT position 15, the low-beam headlights 21 and position lights 22 are always on. However, the driver who drives the vehicle with the light switch 11 always set to the AUTO position 13 is likely to be unfamiliar with the HEADLIGHT position 15. As described above, the low-beam headlights 21 are turned on or off through the same operation to switch from the AUTO position 13 to the SMALL position 14 (Yes in S5 in FIG. 2 and Yes in S9 in FIG. 3). This improves the operability of the light switch 11.

When the low-beam headlights 21 are turned off while position lights 22 are turned on in S6 in FIG. 2, S27 in FIG. 5, or S36 in FIG. 6 (Yes in S51) and the speed of the vehicle is equal to or higher than the third predetermined speed (No in S12) or when the parking brake and park range are both off (No in S13), the third process in FIG. 4 cannot determine whether to turn on or off the low-beam headlights 21 and position lights 22 of the vehicle. In this case, when the position of the low-beam head switch 11 is changed to the OFF position 12 in the second process of FIG. 3 (Yes in S10), the low-beam headlights 21 remain off while the position lights 22 remain on (S53). In other words, when the vehicle is traveling at a speed (equal to or higher than the third predetermined speed) not low enough that the vehicle is thought to be substantially stopped or when the parking brake and park range are released, the vehicle is not stopped or is ready to start. Since the vehicle is moving or is ready to start, all the lights of the vehicle are not turned off even when the light switch 11 is moved to the OFF position 12. When the vehicle is moving or is ready to start, therefore, the position lights 22 are surely turned on, and this simultaneously ensures a certain degree of visibility of the vehicle from surroundings.

In FIG. 4, when the position of the light switch 11 is set to the AUTO position 13 (Yes in S15), the brightness outside the vehicle is lower than the predetermined value (Yes in S14), the speed of the vehicle is lower than the third predetermined speed (Yes in S12), at least one of the parking brake and park range is on (Yes in S13), and the position of the light switch 11 is changed to the OFF position 12 (Yes in S22 in FIG. 5), the low-beam headlights 21 and position lights 22 are turned off (S23). In other words, it is possible to turn off all the exterior lights of the vehicle without causing any problem only when the vehicle is substantially stopped, at least one of the parking brake and park range is on, and the position of the light switch 11 is changed to the OFF position 12 by the driver. When the light switch 11 is moved to the OFF position 12 under the aforementioned conditions, therefore, the low-beam headlights 21 and position lights 22 are able to be turned off through driver's switching operation. This allows all the exterior lights to be turned off as needed.

In FIG. 5, when the low-beam headlights 21 and position lights 22 are turned off (S23) and the speed of the vehicle then increases to the four predetermined speed or higher (Yes in S26), the position lights 22 are turned on while the low-beam headlights 21 remain off (S27). When all the exterior lights of the vehicle are turned off in the situation where no problem could be caused if all of the exterior lights of the vehicle are turned off as described above and the vehicle which has been substantially stopped starts to move at crawling speed, the position lights 22 are turned on first. In other words, when the vehicle is stopped, it may be assumed that there are obstacles, such as walls, around or near the vehicle. At starting, the vehicle will first crawl away from the obstacles or the like and then speed up. In such a situation, the position lights 22 are turned on while the low-beam headlights 21 remain off. This prevents light from the low-beam headlights 21 from reflecting on the obstacles or the like therearound and interfering with the driver's driving operation. Furthermore, the position lights 22 are turned on when the vehicle is crawling, and the vehicle is thereby prevented from traveling with all the exterior lights off. This ensures a certain degree of visibility from surroundings of the vehicle which is traveling in the aforementioned situation.

In FIG. 5, when the low-beam headlights 21 and position lights 22 are off (S23) and the parking brake and park range are both turned off (Yes in S25), the position lights 22 are turned on while the low-beam headlights 21 remain off (S27). In other words, when the vehicle is ready to travel with the parking brake and park range released, the position lights 22 are turned on. This prevents the vehicle from starting with all the exterior lights of the vehicle off.

In FIG. 2, when the position of the light switch 11 is set to the AUTO position 13 (Yes in S3), the brightness outside the vehicle is lower than the predetermined value (Yes in S66), and a failure of the speed sensor 33 is detected (No in S1), the low-beam headlights 21 and position lights 22 are turned on (S11) even if the position of the light switch 11 is changed to the SMALL position 14 or OFF position 12 (S67). In other words, when the speed sensor 33 is detected to have failed, the low-beam headlights 21 and position lights 22 are turned on. Even if the position of the light switch 11 is then changed to the SMALL position 14 or OFF position 12, the low-beam headlights 21 and position lights 22 remain on. This serves as a fail-safe against a failure of the speed sensor 33. This prevents the vehicle from traveling with the low-beam headlights 21 off.

In FIG. 4, when the position of the light switch 11 is set to the AUTO position 13 (Yes in S15), the brightness outside the vehicle is lower than the predetermined value (Yes in S14), and at least one of the parking brake sensor 63 and park-range sensor 65 has failed (No in S16), the low-beam headlights 21 and position lights 22 are turned on (S17). In other words, when at least one of the parking brake sensor 63 and park-range sensor 65 has failed, the low-beam headlights 21 and position lights 22 are turned on. This prevents the vehicle from traveling with the low-beam headlights 21 off when these sensors have failed.

What is claimed is:
1. A light system for a vehicle, comprising
a combination switch set to a rotation position to be rotationally changed for switching modes of a light that provides illumination outside, wherein
the rotation position includes an AUTO position and a SMALL position,
the combination switch includes a mechanism which is configured to return the rotation position to the AUTO position when the rotation position is changed to the SMALL position,
the light includes a low-beam headlight and a position light, and
the low-beam headlight is turned on when:
 a speed of the vehicle having the light system is lower than a first predetermined speed;
 the rotation position is then changed to the SMALL position to turn off the low-beam headlight; and a travel distance of the vehicle since turn off of the low-beam headlight reaches a predetermined distance.

2. The vehicle light system according to claim 1, wherein the low-beam headlight is turned on when the speed of the vehicle reaches a second predetermined speed equal to or higher than the first predetermined speed before the travel distance reaches the predetermined distance.

* * * * *